United States Patent

[11] 3,580,538

| [72] | Inventor | Leon M. Wyrick<br>Pleasant Hill, Calif. |
|---|---|---|
| [21] | Appl. No. | 786,527 |
| [22] | Filed | Nov. 20, 1968 |
| [45] | Patented | May 25, 1971 |
| [73] | Assignee | Chevron Research Company<br>San Francisco, Calif.<br>Continuation-in-part of application Ser. No. 492,191, Oct. 1, 1965, now abandoned. |

[54] PNEUMATIC SYSTEM FOR AIR MOTOR CONTROL
7 Claims, 4 Drawing Figs.

[52] U.S. Cl. .................................................. 251/29,
91/465, 91/388, 137/596.18
[51] Int. Cl. ..................................................... F15b 13/16,
F16k 13/12
[50] Field of Search............................................ 91/465,
388, 390; 137/596.14, 596.18; 251/29, 31

[56] References Cited
UNITED STATES PATENTS
2,880,705  4/1959  Schneider..................... 91/465x

*Primary Examiner*—Arnold Rosenthal
*Attorneys*—A. L. Snow, F. E. Johnston, R. L. Freeland, Jr. and H. D. Messner

ABSTRACT: In a pneumatic amplifying and actuating circuit for a control system useful in controllably varying a stem of a valve within a process line, complementary output stages of the amplifying and actuating circuit are separately utilized (depending on the direction of deviation of a control signal with respect to a setpoint pressure level) to automatically control the repositioning of the valve stem.

Patented May 25, 1971

INVENTOR
LEON M. WYRICK
BY *Ralph L. Freeland*
*Harold D. Messner*
ATTORNEYS

Patented May 25, 1971

INVENTOR
LEON M. WYRICK
BY
ATTORNEYS

PNEUMATIC SYSTEM FOR AIR MOTOR CONTROL

RELATED APPLICATION

This application is a continuation-in-part of Ser. No. 492,191 filed Oct. 1, 1965, and now abandoned, entitled "Pneumatic System for Air Motor Control."

This invention relates to process controllers for controlling the value of a variable condition, such as temperature, pressure or flow rate, as a function of a control signal indicating deviations from a particular standard condition within a process line. More particularly, the invention relates to pneumatic control systems for adjusting a valve that regulates the flow rate of a condition-varying medium within a process line, and has as one of its objects the provision of an improved pneumatic controller connected to such a valve capable of detecting slight changes in a process variable from a preselected setpoint and capable of actuating an air motor as deviations from the setpoint occur by means of a novel pneumatic amplifier and actuator system.

Briefly, the stepup amplifier and actuator system of the present invention responds to rather low pressure control signals from a pneumatic comparator and increases the relative magnitude of that signal a predetermined amount based on the gain of the system, roughly 2:1. The amplifier and actuator system preferably includes a pneumatic differential amplifier having complementary first and second output stages, each of which is connected to a separate pilot valve to control air flow to the air motor. The pilot valves interconnect between a high-pressure source and the air motor, the air motor controlling the valve in the process line. In operative sequence, the position of the stem of the valve is detected by a position transmitter and compared to a reference signal through the comparator which, in turn, supplies the control signal to the differential amplifier. The differential amplifier increases the value of that signal; it is gated "on" by the signal from the comparator, but only in one of the two output stages in accordance with the direction of deviation of the control signal from the setpoint. To provide directional stability, the differential pneumatic amplifier preferably comprises two complementary differential relays having common first input ports connected to each other through a common air supply which pressure is greater than the control signal from the comparator, separate output ports separately connected to the pilot valves, second input ports connected to the comparator, and spring-loaded valve plugs within each of the differential relays complementarily actuated depending on the direction of the magnitude of the control signal above or below the common setpoint of the relays to operate one of the pilot valves. In that manner, the construction of the pilot valve controlling the air flow to the air motor is simplified since it must respond in one direction only. Either pilot valve snaps from fully closed to fully opened on the occurrence of the control signal. In the quiescent state, there is no buildup of pressure at the pilot valve.

Heretofore, the air motor valve stem throttling action of the controller systems has been achieved by means of a special comparator pilot valve used in conjunction with the air motor operatively attached to the stem of the process valve. Usually, the comparator pilot valve includes two output ports connecting a high-pressure source to the air motor and a spring-loaded valve plug operated in either of two directions to open one of these ports in response to changes in the level of the control signal being fed into the device. Needless to say, the device is rather expensive to manufacture owing to the requirement that the device must sense rather small changes in deviations of the level of the control signal from the setpoint, yet have the capability of fast action to open either output ports to efficiently operate the air motor. Moreover, such devices also require frequent inspection and adjustments in operating elements—especially the springs forming the delicate balance for the plug valve—as the parts become easily misaligned during operations.

In accordance with the present invention, the need for special comparator pilot valves is eliminated by amplifying the control signal from the comparator in the direction of deviation from the setpoint prior to use to operate either one of the two conventional pilot valves controlling operation of the air motor. In that manner, the proportional signal from the comparator actuates only one output stage of the differential amplifier depending on the directions of the deviation from the setpoint. Thus, after being amplified and connected to a conventional pilot valve (where no signal previously existed), the amplified control signal causes the proper pilot valve to snap from a fully closed to fully opened operation and there remain until the differential amplifier ceases operation. In that manner, special precision in the operation of the pilot valve is not required since operation is unidirectional—the valve plug traveling from fully closed to fully opened on application of a control signal.

Other features of the invention will appear from a reading of the following detailed description of an embodiment thereof taken in conjunction with the accompanying drawings, in which.

Figure 1:
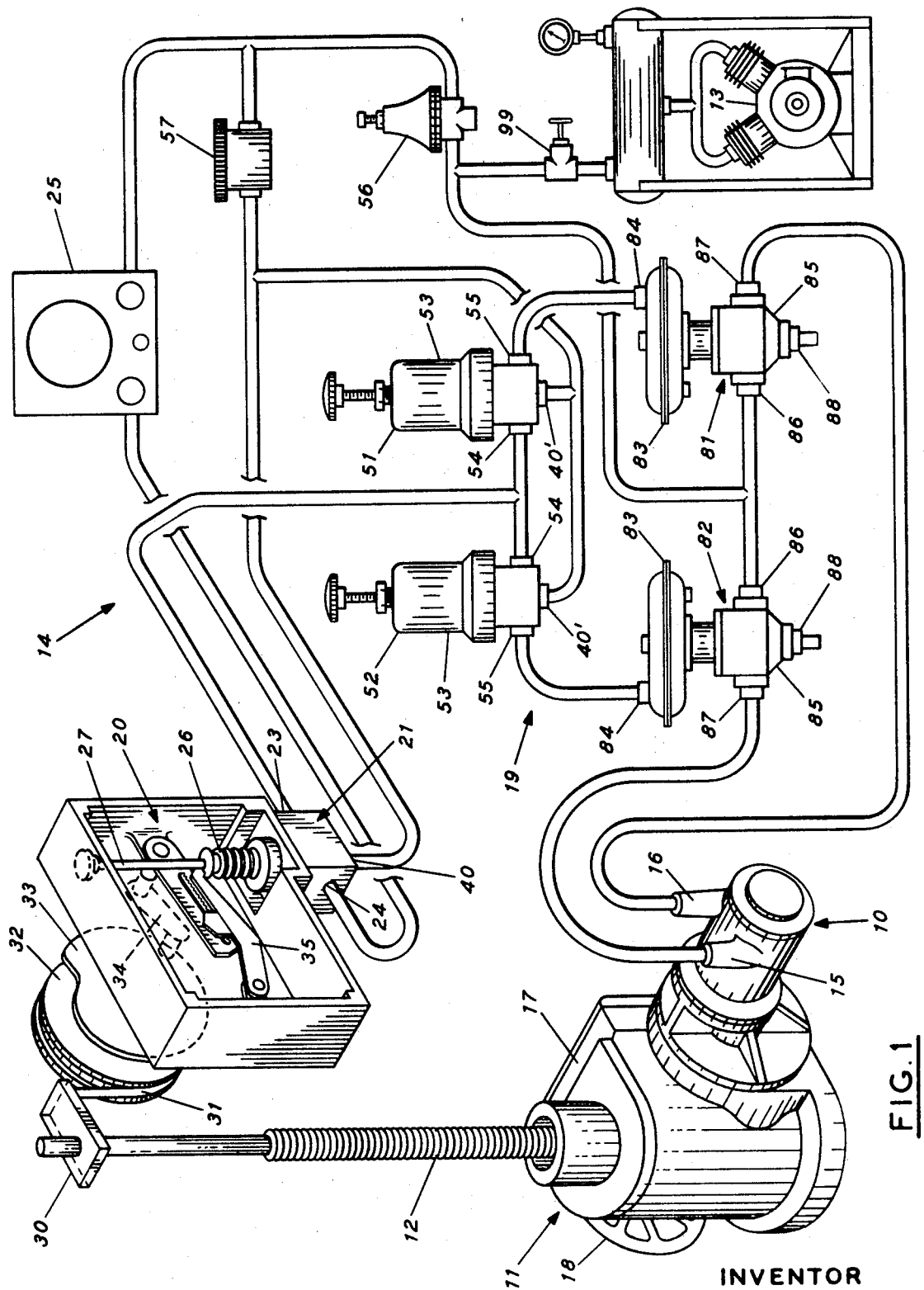
FIG. 1 is a perspective view, partially schematic, of the process controller of the present invention.

Referring now to the Figures, particularly FIG. 1, it is seen that the numeral 10 designates an air motor operatively connected to a rising stem valve 11 to adjust the valve opening and vary the flow rate of a condition-varying medium in a process line (not shown). For ease of description, the valve 11 has conventional internal parts including a valve plunger and stuffing box, the valve plunger connecting to stem 12 through the stuffing box.

To provide energy to actuate the air motor 10, air is conveyed from compressor 13 to either of the vein ports 15 and 16 of the motor, and has a time duration of "pulse" determined by the time period of deviation of a process variable from a preselected standard, as determined by the process controller of the present invention, generally indicated at 14. As air passes through the motor 10, a drive shaft (not shown) is rotated either in a forward or reverse direction, depending upon entry occurring at vein ports 15 or 16, by a vein-carrying rotary assembly eccentrically mounted within the motor housing. The rotary assembly includes a vein chamber whose volume varies during rotation to allow the air to expand and cause added rotation of the rotary assembly.

Stem valve 11 includes the stem 12 threadably connected to housing 17 and rotatable to adjust a conventional valve plug relative to a fixed valve seat. Preferably, the air motor connects to the stem through a gear reducer and worm-sector gear coupler (not shown) in order to convert rotation of the air motor drive shaft to vertical displacement of the valve plug. However, manual operation of the valve may be desirable in some instances—e.g., during setup of the valve and controller or when failure of the main air supply occurs—and this may be achieved through handwheel 18. The handwheel preferably includes a declutching lever (also not shown) which simultaneously couples the handwheel to the stem 12 and disconnects the air motor from the valve plunger.

Controller 14 operatively connects between the air motor 10 and compressor 13 and includes a complementary pneumatic amplifier and actuator circuit, generally indicated as 19, controlled by a pneumatic comparator 20. The comparator 20 is of conventional design as described in U.S. Pat. No. 2,616,448 and preferably includes a pneumatic relay pilot 21 mechanically connected to the stem of the valve through a position transmitter 22. Relay pilot 21 is similar to the relay illustrated in FIG. 2; it preferably includes a pilot valve plug which varies the output of air provided at output port 23 to a preferred level—i.e., to the level required to actuate the pneumatic amplifier and actuator circuit 19 to achieve and hold a proper position for the stem 12.

Pneumatic control instrument 25 is of conventional design as described in U.S. Pat. No. 2,616,448 entitled "Control System," R. B. Werey, issued Nov. 4, 1952. Briefly, the purpose of control instrument 25 is to respond to the value of a variable condition that is to be maintained at some constant value. As shown, instrument 25 is supplied with air under a regulated pressure and operates in a well-known manner to vary the output pressure to inlet port 24 of relay 21 in proportion to the amount of variation in the value of the condition under control. For example, as the value of the condition varies in one direction, or the other, from a setpoint pressure level, the output pressure of port 24 will be varied proportionally. This pressure is applied through relay 21 and amplifier and actuator circuit 19 to control operation of motor 10 and thence the position of the stem 12 of valve 11.

In effect, the relay 21 acts as a gate switch opening or closing airflow from supply port 40 to output port 23 depending upon whether the stem position of valve 11 is below or above the desired position designated by the level of the reference signal appearing at the inlet port 24. When the stem position is above the desired position, e.g., after the level of the reference signal appearing at inlet port 24 has been reduced, the pressure at the output port 23 is likewise reduced by exhausting it to the atmosphere as by way of an opening (not shown) in the housing of relay 21 as described in the aforementioned patent. This, in turn, induces movement of the air motor 10 which, in turn, changes the position of stem 12 of the valve 11. It should be noted that when the port 40 is closed to port 23 within the relay 21, the port 23 is simultaneously opened to the atmosphere. This operation is similar to that of relay 52 of FIG. 2, which is described in more detail hereinafter. Conversely, when the stem position is below the desired position, e.g., after the level of the reference signal at port 24 has been increased, the supply port 40 is opened to output port 23. Simultaneously port 23 is closed to the atmosphere. When the reference signal has been balanced in the comparator 20, it should be noted that the output port 23 is not closed to the flow of air, but remains in a neutral position between fully opened and fully closed settings to provide a relatively low level neutral setpoint pressure level, say 9 p.s.i.g., for the complementary pneumatic amplifier and actuator circuit 19. Accordingly, at the amplifier and actuator circuit 19, the aforementioned relatively low setpoint level provides that circuit with better sensitivity—and hence with a faster response characteristic—than if a higher setpoint level was used.

Transmitter 22 is seen to include connection block 30 fixed to the stem of the valve and fitted with a cable 31. The cable 31 is wound on a drum 32 geared to cam 33 whose follower 34 pivots the linkage bar 35 in contact to cause vertical movement of the range spring 26. If the stem changes vertical position, the transmitter measures the extent of movement in relation to a zero registry position through change in the compression of the range spring. Thus, in effect, the relay 21 is provided with a feedback signal through the transmitter 22 which must become equal to the pressure level provided at its input port 24.

To increase the magnitude of the control signals emanating from the comparator 20 as well as retain the direction of deviation from the reference signal applied to the comparator, the amplifier and actuator circuit 19 is provided with a differential pneumatic amplifier consisting essentially of two complementary pneumatic relays 51 and 52 having complementary output stages. The relays 51 and 52 are conventional in design and each has a housing 53 through which is formed an inlet port 54 connected to the comparator, an outlet port 55, and a supply port 40' appropriately connected to the compressor through a reducer valve 56 and gauge 57.

Figure 2:
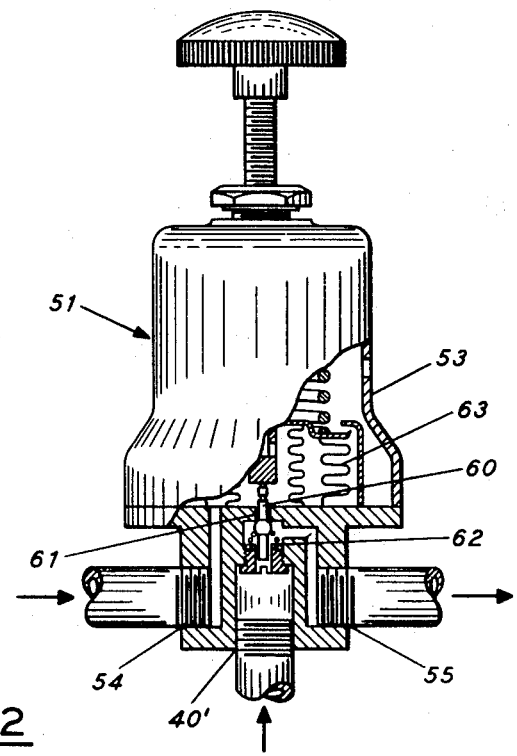
FIG. 2 is an elevational view, partially cut away, of a pneumatic relay forming one complementary amplifying stage of the process controller of FIG. 1.

Now referring to FIG. 2 illustrating direct acting relay 51, it is to be noted that valve plunger 60 is normally sealably located on seat 62 closing output port 55 to supply port 40. That is to say, at the neutral setpoint of the comparator 20, the valve plunger is adapted to be seated on the shoulders of the seat 62 to block passage of the air from the supply port to the output port. Thus, when the control system is at the correct setpoint level, the output airflow from the amplifier is zero.

Only positive increases in air pressure actuate relay 51 while decreases in air pressure from the setpoint of the comparator 20 and amplifier and actuator circuit 19 actuate relay 52, but not vice versa. With reference to FIG. 2, the unidirectional operating mode of relay 51 is illustrated. As previously explained, the valve plunger 60 is normally placed in sealing contact with valve seat 62. With deviations above setpoint ("positive" changes), however, the bellows 63 is elongated and carries the valve plunger 60 from the seat 62 to sealing contact with the exhaust port 61, as is illustrated. Thus, the supply port 40' is open to the output port 55 where pressure snaps from zero p.s.i.g. to the full value of the air supply at the supply port, say 20 p.s.i.g. It should be noted that this pressure is always greater than that of the control signal.

On the other hand, reverse operating relay 52 has a bellows-plunger arrangement operative by inlet pressures below the setpoint of the comparator to open its output port. Since the relays 51 and 52 have a common source, the change in air pressure at the output port of either relay is identical, although oppositely actuated. That is, pressure at the output port of the reverse operating relay 52 snaps from zero p.s.i.g to full supply value of the source when actuated by a control signal below the setpoint of the comparator 20 and circuit 19. Since the relay 52 has a reverse mode of operation to that of the relay 51, its input port 54 can be directly connected to the input port of the relay 51 without hindering the operation of either relay.

Figure 3:
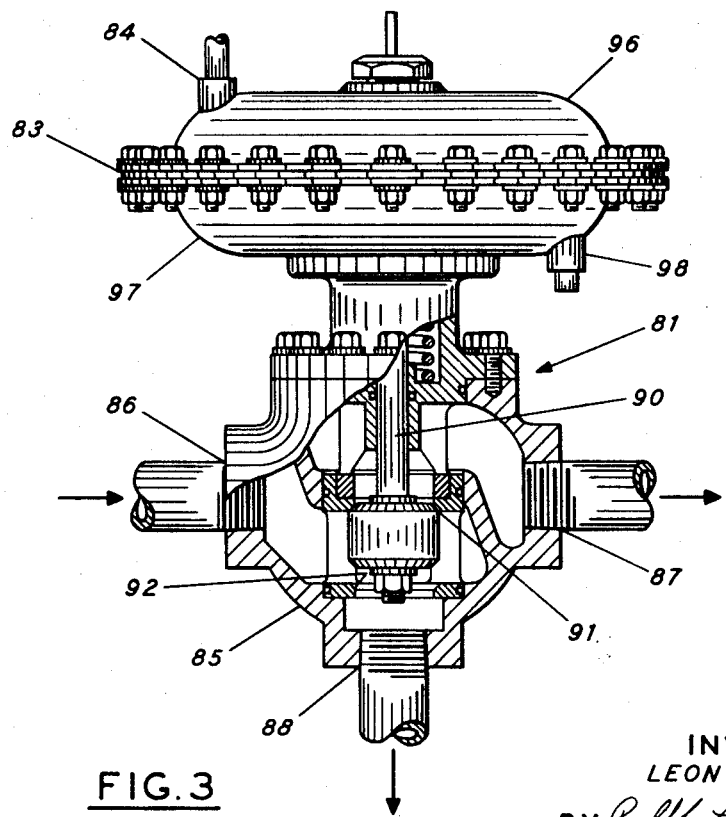
FIG. 3 is an elevational view, partially cut away, of a pilot valve forming a direct acting control element for the controller of FIG. 1.
Figure 4:
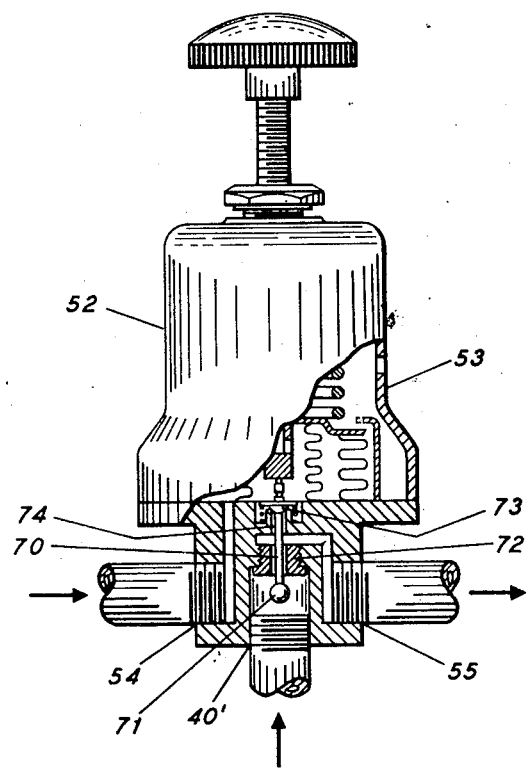
FIG. 4 is an elevational view, partially cut away, of a pilot valve performing as a reverse acting control element for the controller of FIG. 1.

FIG. 4 illustrates operating relay 52 in more detail. As shown, the plunger 70 of the relay 52 is longer than that of relay 51. At the remote end, the plunger 70 is seen to be provided with a valve plug 71 adjacent to the junction of the seat block 72 and supply port 40'. The valve plug 71 is adapted to be released from its seat on the shoulder provided at the seat block 72 to allow passage of the air from the supply port 40' to the output port 55 when the inlet pressure at port 54 is below the neutral setpoint level of the controller 14. The plunger 70 is also provided with another valve plug 73 positioned adjacent exhaust port 74. It is evident that the bellows-plunger arrangement of the relay 52 moves downward when air pressure is below the setpoint of the system (i) to open supply port 40' to output port 55 and (ii) to close exhaust port 74 to ports 40' and 55 as shown in FIG. 4. It should be further evident from the above detailed descriptions of FIGS. 3 and 4 that the relays 51 and 52 provide modes of operation that are separate and complementary. Thus when the deviation of the pressure is above the setpoint level of the circuit 19, only relay 51 operates and relay 52 is placed in a quiescent state. Conversely, when the deviation from the neutral setpoint level is below that level, only relay 52 operates, and the relay 51 is placed in a quiescent state.

Connected to the output port 55 of the relays 51, 52 are conventional relay pilot valves 81 and 82. Each valve has an upper housing 83 fitted with a pilot diaphragm and single inlet port 84 for controlling airflow between inlet port 86 and outlet port 87 in lower housing 85. Exhaust port 88 in lower housing 85 of each valve is normally open to inlet port 86 connected to the compressor 13 but is closed thereto when the valve 81, 82 is respectively actuated by the relay 51, 52. When actuated, each valve is unidirectionally operated; the valve plunger snaps from a fully closed position to a fully opened one in which compressor 13, via outlet port 87, is directly connected to air motor 10. As previously noted, the relay pilot valve 81 connects to relay 51, while relay pilot valve 82 connects to the reverse operating relay 52. The operating sequence of each valve is identical, however, although the initiating signal response is opposite depending on the direction of deviation of the control signal from the setpoint.

Referring now to FIG. 3, relay pilot valve 81 is illustrated and is seen to include a pilot valve plunger 90 normally seated against the shoulder of valve seat 91 and, simultaneously, in operative contact with the pilot diaphragm between adjacent chambers 96 and 97 of upper housing 83. In operation, high-pressure air enters the valve at the inlet port 86 in the normal or "off" cycle and is exhausted to the atmosphere via exhaust port 88. The pressure within chambers 96 and 97 is atmospheric since the outlet vent 98 remains open during operation of the valves and the relay 51 opens the chamber 96 to the atmosphere via its exhaust port 61 (FIG. 2). When relay 51 is actuated by a signal output from the comparator, there is an increase in pressure in the upper chamber 96 of the valve. Assuming the actuated relay to be relay 51, it is seen in FIG. 3 that the pilot valve plunger 90 of the valve 81 would move from the position shown into sealing contact with the valve seat 92 at the exhaust port 88, opening outlet port 87 and closing exhaust port 88. Air pressure, the magnitude of which is controlled by valve 99 at the outlet of the compressor, flows directly to air motor 10 via inlet port 84 and outlet port 87.

It is to be noted that the magnitude of the air pressure at ports 87 of the pilot valves 81 and 82 varies with the operating characteristics of the air motor but, in any case, is always greater than the pressure of the control signal provided by the relays 51 and 52. The duration of operation of each pilot valve is determined by the time required to relocate the stem of the valve to the correct position, as determined by the comparator 20. When the correct stem location is achieved, the signal level of the comparator returns to the neutral setpoint value, and the relay previously operating is inactuated. In turn, the pilot valve connected to that relay returns to its normal operating position in which the air from the compressor 13 is again exhausted to the atmosphere through exhaust port 88.

These and other advantages are obtainable when operating in accordance with one foregoing embodiment of the invention or with any of numerous variations that could be made by those skilled in the art without departing from the spirit of the invention; and all such variations that fall within the scope of the appended claims are intended to be embraced thereby.

I claim:

1. Control system to controllably vary a stem of a valve within a process line, by establishing a first signal representing the position of the stem of said valve to be regulated, a second signal representing a predetermined setpoint of relatively low magnitude, a third signal representing the difference between said first and second signals and comprising pressurized air of a predetermined level above that of the atmosphere, comprising:
   means having complementary amplifying output stages operative in response to said third signal to amplify said third signal to a predetermined constant level, each of said complementary output stages singularly operative to amplify said third signal in accordance with the direction of deviation of said third signal above or below said predetermined setpoint;
   first and second pilot controlled valves, each of said valves having pilot diaphragm means connected to and controlled by one of said output stages of said amplifying means, an input port, a normally closed output port and a valve plunger means operatively connected to said pilot diaphragm means and responsive to said amplified signal whereby said output port is placed in fluid communication with said input port on the occurrence of said amplified signal at said pilot diaphragm means;
   an air motor operatively connected to said stem of said valve to be regulated, and having separate first and second input ports wherein each is connectable to one of said output ports of said pilot valves; and
   an air source of relatively high pressure connected to said input ports of said pilot valves.

2. Control system in accordance with claim 1 in which said amplifying means comprises a source of air, and first and second complementary differential relays having common input ports, each of said relays simultaneously receiving said third signal but only one of which being operated thereby depending on the direction of said third signal above or below said setpoint, common supply ports connectable to said air source, separate output ports operatively connectable to said pilot valves for control thereof, and separate plunger means, each of which being complementarily actuated by said third signal to place said output port in fluid contact with said supply port.

3. Control system of claim 2 in which said source of air includes regulating means to control the magnitude thereof to a constant level above that of said third signal.

4. Control system of claim 3 in which said magnitude of air pressure of said source is approximately twice that of said third signal.

5. Control system of claim 1 in which each of said pilot valves includes an exhaust port normally open to and in fluid communication with said input port and with the atmosphere exterior of said pilot valve.

6. In a control system to vary a stem of a valve within a process line in which said stem is operatively connected to an air motor and said air motor is selectively connected to a pneumatic source to provide a pulse of air to actuate said air motor by establishing a first signal representing the position of said stem of said valve, a second signal representing a predetermined setpoint of relatively low magnitude, and a third signal representing the difference between said first and second signals and comprising pressurized air of a predetermined level above that of the atmosphere, a pneumatic amplifier and actuator circuit comprising:
   means having complementary amplifying output stages operative in response to said third signal to amplify said third signal to a predetermined constant level, each of said complementary output stages singularly operative to amplify said third signal in accordance with the direction of deviation of said third signal above or below said predetermined setpoint; and
   first and second pilot controlled valves, each of said valves having pilot diaphragm means connected to and controlled by one of said output stages of said amplifying means, an input port, a normally closed output port and a valve plunger means operatively connected to said pilot diaphragm means and responsive to said amplified signal whereby said output port is placed in fluid communication with said input port on the occurrence of said amplified signal at said pilot diaphragm means to allow passage of said pulse of air to actuate said air motor.

7. The pneumatic amplifier and actuator circuit of claim 6 in which said amplifying means comprises first and second complementary differential relays having common input ports, each of said relays simultaneously receiving said third signal but only one of which being operated thereby depending on the direction of said third signal above or below said setpoint, common supply ports, separate output ports operatively connectable to said pilot valves for control thereof, and separate plunger means, each of which being complementarily actuated by said third signal to place one of said output ports of one of said relays in fluid contact with said common supply ports.